United States Patent [19]

Stirnweiss

[11] 4,378,076
[45] Mar. 29, 1983

[54] DEVICE FOR MELTING AND DISCHARGING A THERMOPLASTIC MATERIAL

[75] Inventor: Peter Stirnweiss, Maisach, Fed. Rep. of Germany

[73] Assignee: Hilti Aktiengesellschaft, Schaan, Liechtenstein

[21] Appl. No.: 213,627

[22] Filed: Dec. 5, 1980

[30] Foreign Application Priority Data

Dec. 11, 1979 [DE] Fed. Rep. of Germany ....... 2949743

[51] Int. Cl.³ ............................................. B67D 5/62
[52] U.S. Cl. ............................ 222/146 HE; 74/164; 226/127; 226/129; 226/165
[58] Field of Search ............ 222/146 HE, 146 R, 391; 221/243; 74/163, 164; 226/127, 129, 133, 144, 165

[56] References Cited

U.S. PATENT DOCUMENTS

| 2,406,516 | 8/1946 | Treciokas | 221/243 |
| 3,377,012 | 4/1968 | Cushman | 228/40 |
| 4,289,257 | 9/1981 | Herb et al. | 222/391 |

*Primary Examiner*—David A. Scherbel
*Attorney, Agent, or Firm*—Toren, McGeady and Stanger

[57] ABSTRACT

A device for melting a rod-shaped member of thermoplastic material and discharging the melted material includes a casing containing a melting chamber. A transport element within the casing grips the rod-shaped member and feeds it into the melting chamber. In a mechanism for displacing the transport element and thereby feeding the rod-shaped member, an overload member is provided which discontinues the displacement of the transport element when a predetermined pressure is exceeded within the melting chamber.

11 Claims, 8 Drawing Figures

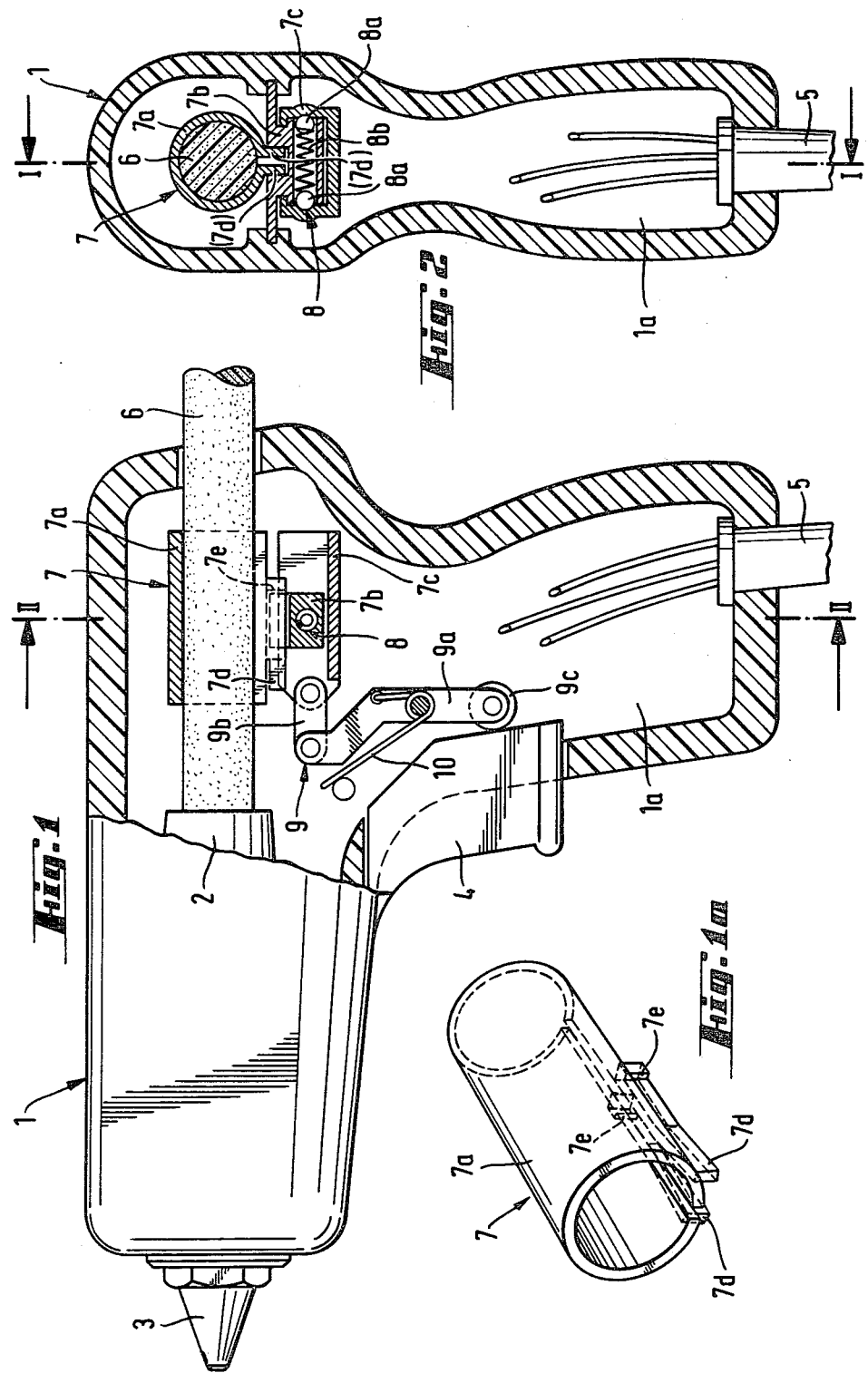

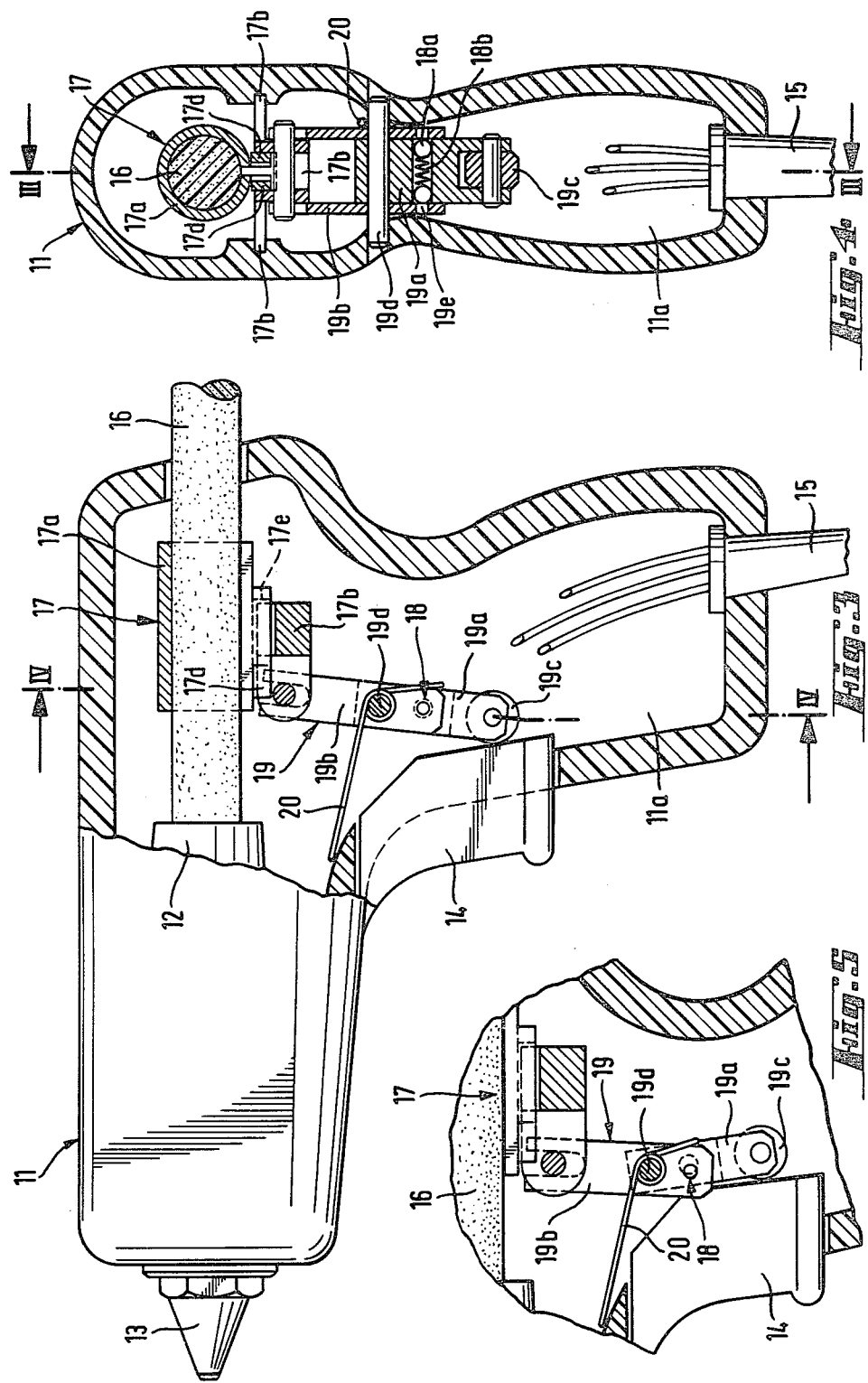

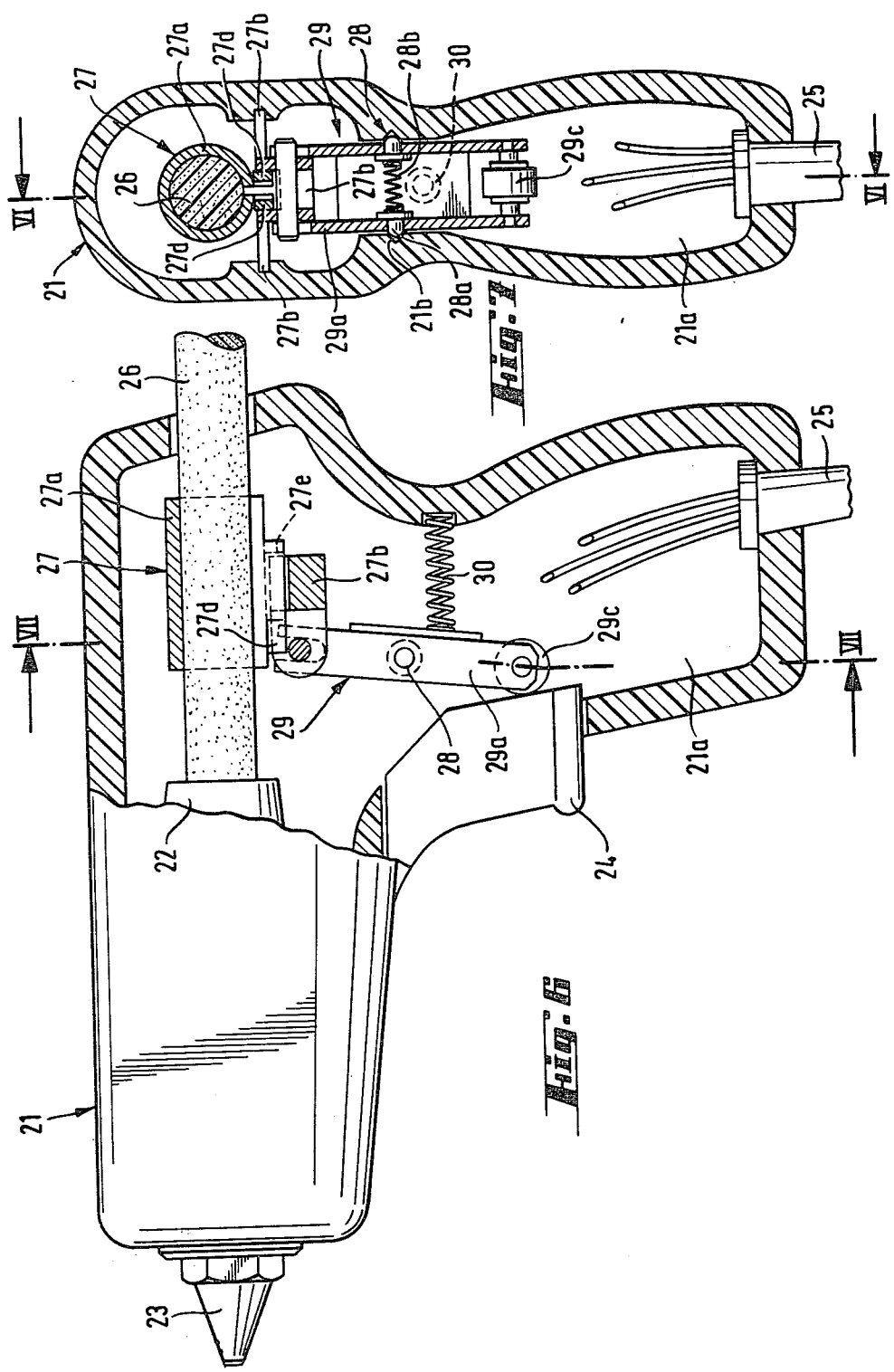

DEVICE FOR MELTING AND DISCHARGING A THERMOPLASTIC MATERIAL

SUMMARY OF THE INVENTION

The present invention is directed to a device for melting a rod-shaped member formed of thermoplastic material and for discharging measured amounts of the melted material. The device includes a melting chamber with a transport element for feeding the rod-shaped member into the melting chamber and an actuating member for displacing the transport slide via a transfer member positioned between the actuating member and the transport element.

Devices of this type are often referred to as "melted glue guns" because of their shape. In addition to discharging an adhesive, thermoplastic materials are also used as filling substances and sealing substances. The thermoplastic material is solid at room temperature. As the rod-shaped member is fed into the melting chamber, the rearward and still solid part of the thermoplastic material serves as a closure and seal for the rearward or inlet end of the melting chamber. As the transport element is displaced, another axially extending section of the rod-shaped member is pushed into the melting chamber and a corresponding portion of the volume of the melted material in the melting chamber is displaced through an outlet nozzle from the chamber. During rapid successive displacement steps or cycles of the transport element, the melting capacity of the melting chamber is inadequate to melt all of the material introduced into the chamber. Since all of the thermoplastic material within the chamber cannot be melted, a considerable excess pressure is developed in the chamber. In such a situation, the pressure may become so great that the portion of the rod-shaped member, still in the solid condition, no longer seals the inlet into the melting chamber with the result that a portion of the melting substance may leak out through the inlet end of the chamber. After a short period of time, the outflow of the melted material usually leads to failure of the device, because the transport mechanism for the rod-shaped member becomes blocked. In addition, the thermal-lag switches, serving for temperature control, may also be rendered inactive by the outflowing material causing the device to overheat and burn out.

In a known device, a compression spring is used as an accumulator in the transport mechanism. Such a gradually working elastic element, however, does not permit the operator to appreciate when an excessive feeding pressure is reached. In the worst situation, a compression spring is collapsed so that it is no longer effective and the pressure in the melting chamber exceeds the permissible value.

Therefore, it is the primary object of the present invention to limit the force applied to the transport mechanism for feeding the rod-shaped member into the melting chamber so that a damaging excess pressure cannot be generated within the melting chamber.

In accordance with the present invention, an overload member is provided in the transport mechanism which interrupts the displacement of the transport element when a predetermined load is exceeded. Such an overload member becomes effective only when a predetermined value is exceeded. When the overload member becomes effective, the resistance at an actuating member decreases immediately in a noticeable manner. Such a decrease can be recognized immediately by the person operating the device. Applying additional pressure on the actuating member is ineffective, because the transfer of force to the transport element has been interrupted and cannot be reestablished until the overload member reseats itself.

Various known elements, such as friction or preset breaking elements, can be used as overload members. The use of friction members usually results in a considerable dispersion of the release value due to the condition of the elements which effect the friction ratios. Preset breaking elements have the disadvantage that they can be used only once and then must be replaced. Accordingly, it is advantageous to utilize an overload member which can be operated a number of times without significant wear or damage. If the overload member can be properly reset, there is no interruption in operation because the device is immediately ready for use after it is reset.

For reasons of economy, an overload member in the form of a ball retainer assembly is considered to be especially useful. Commercially available standard parts can be used for the ball retainer assembly. Ball retainer assemblies are less sensitive compared to other devices, such as flat springs and the like, and they also permit a larger spring deflection. Since standard parts can be used, exchanging or replacing damaged or lost parts causes no problems.

For reasons of space requirements, it is advantageous if the overload member is incorporated as part of the transfer means which displaces the transport elements. The transfer means is protected to a large extent in such an arrangement, because it only has to transfer the force permitted by the overload member. Placement of the overload member between the transport element and the transfer means is especially advantageous, since a point of force transfer is present. Connecting the transfer means to the transport element by a releasable overload member also results in significant advantageous when the device is taken apart for inspection purposes.

In another possible arrangment, the overload member is incorporated in the transfer means as part of a lever so that one part of the lever is movable relative to another. Levers in which one part moves relative to another are already known in transport mechanisms used for regripping. In this known mechanism, however, stops are present which permit bending only in a no-load stroke. A spring acting on the lever serves to return the bendable portion. By placing an overload member in the transfer lever, which can be bent itself, makes it possible to utilize this basic device with or without any excess pressure protection. If no excess pressure protection is required, the bendable lever can be replaced by a rigid lever or can be reinforced by means of a peg.

In still another embodiment, the overload member is used as part of the pivotal support for the transfer means in the form of a lever. With such an arrangement of the overload member, the same lever can be used as a simplified embodiment without excess pressure protection as in an arrangement with excess pressure protection. The difference merely involves the pivotal support for the lever. If no excess pressure protection is required, then a rigid support of the lever can be used instead of the overload member which affords a releasable support for the lever.

It is possible to install several overload members in the device. Such an arrangement is feasible, however, only if the overload members are adjusted to one another and if, for safety reasons, there is not adequate protection with only one overload member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing:

FIG. 1 is a side elevational view, partly in section, of a device embodying the present invention with an overload member incorporated as part of the transport slide;

FIG. 1a is an enlarged perspective view of the transport sleeve illustrated in FIG. 1;

FIG. 2 is a sectional view of the device taken along the line II—II in FIG. 1;

FIG. 3 is a side elevational view, similar to FIG. 1, illustrating another embodiment of the invention with an overload member affording bending protection;

FIG. 4 is a sectional view of the device taken along line IV—IV in FIG. 3;

FIG. 5 is a partial sectional view of the device shown in FIG. 3 with the overload member in the released position;

FIG. 6 is a side elevational view similar to FIGS. 1 and 3 illustrating still another embodiment of the present invention with an overload member forming the portion of the support for the transfer means; and FIG. 7 is a sectional view of the device taken along line VII—VII in FIG. 6.

DETAIL DESCRIPTION OF THE INVENTION

In FIG. 1 a device is illustrated for melting thermoplastic material and the device includes a hand-gun shaped casing 1 having a handle 1a. As viewed in FIG. 1 the front end of the gun is at the left-hand side and the rear end is at the right-hand side. A melting chamber 2 is located in the casing adjacent its front end and only the rear end of the melting chamber is shown in the sectioned portion of the casing. Melting chamber 2 extends to the front end of the casing 1 where it has an outlet nozzle 3 for discharging measured amounts of the thermoplastic material. A trigger-like actuating member 4 is located within the handle 1a. A power supply 5 is connected to the lower end of the handle as viewed in FIG. 1. The thermoplastic material is supplied into the device as a rod-shaped member 6. The rod-shaped member 6 is introduced through an opening in the rear end of the casing 1 and is moved forwardly into the rear or inlet end of the melting chamber 2. A transport slide 7 feeds the rod-shaped member 6 into the melting chamber 2. Transport slide 7 includes an elastic clamping sleeve 7a which encloses and grips the rod-shaped member 6, and an adjustable block 7b which can be connected to the clamping sleeve by means of wedge lugs 7d extending obliquely of the axial direction of the clamping sleeve and the rod-shaped member. Adjustable block 7b is connected with a drive shoe 7c by a ball retainer assembly 8. A transfer member 9 extends between the actuating member 4 and the transport slide 7. Transfer member 9 is made up of a two-arm lever 9a and a connector plate 9b extending between the upper end of the lever 9a and the drive shoe 7c. At its lower end, the lever 9a supports a roller 9c. Roller 9c engages the surface of the actuating member 4. A return spring 10 biases the lever 9d so that the roller 9c is maintained in contact with the surface of the actuating member 4. Ball retainer assembly 8 serves as an overload member limiting the displacement force conveyed to the transport slide 7 by the actuating member 4 via the transfer member 9. The limitation in the displacement force is necessary to prevent the development of excess pressure within the melting chamber 2 with a consequent outflow of the melted thermoplastic material from the rear or inlet end of the melting chamber 2. If the pressure within the melting chamber 2 provides too much resistance against the rod-shaped member 6, the ball retainer assembly 8 disengages the drive shoe 7c from the adjustable block 7b and further displacement of the clamping sleeve 7a is discontinued. The trailing end of the clamping sleeve 7a is provided with shoulders 7e interacting with the trailing end of the adjustable block 7b for displacing the clamping sleeve 7a in the rearward direction, returning it to its initial position for effecting the feeding movement of the rod-shaped member 6.

In FIG. 1a the clamping sleeve 7a is shown in a perspective view. As shown in dashed lines, a slot extends through the wall of the clamping sleeve 7a in the axial or longitudinal direction of the sleeve. As a result, the clamping sleeve can be expanded and contracted. The oblique wedge lugs 7d extend along and downwardly from the outside surface of the sleeve with the lugs being in diverging relationship toward the front end of the casing 1. As the adjustable block 7c is moved in the forward direction by the drive shoe 7c it rides up on the oblique wedge lugs 7d pressing them inwardly and, in turn, pressing the clamping sleeve tightly about the rod-shaped member 6 so that the rod-shaped member can be moved forwardly into the melting chamber. If the actuating action is released and the drive shoe 7c is returned rearwardly it moves the adjustable block 7b against the shoulders 7e moving the clamping sleeve 7a in the rearward direction until it returns to its initial position for commencing a feeding step of the rod-shaped member 6.

In FIG. 2 the circular cross-section of the rod-shaped member 6 and of the clamping sleeve 7a can be noted. As the adjustable block 7b is moved relative to the clamping sleeve 7a, the clamping sleeve is pressed by the wedge lugs 7d and clamps the rod-shaped member. The continued movement of the adjustable block 7b draws the clamping sleeve 7a and the rod-shaped member 6 in the forward direction feeding the rod-shaped member into the melting chamber 2. In the portion of the adjustable block 7b extending downwardly into the drive shoe 7c there is a bore extending transversely of the casing 1 and the ball retainer assembly 8 is positioned within this bore. Ball retainer assembly 8 consists of a pair of balls 8a and a compression spring 8b biasing the balls outwardly from the bore. The biasing action presses the balls 8a into corresponding recesses in the inside surface of the drive shoe 7c. The maximum displacement force for feeding the rod-shaped member 6 is limited by the compression spring 8b. When the displacement force is overcome by the pressure generated within the melting chamber 2, the balls 8a are released from the recesses in the guide shoe and the transfer of displacement force between the drive shoe 7c and the adjustable block 7b is interrupted. This arrangement of the overload member is especially useful because it permits a compact construction.

Spring 10 biases the lever 9a toward the actuating member 4 so that the roller 9c is maintained in contact with the actuating member. During operation of the device, the actuating member 4 is pulled in the manner of a trigger into the casing. When the actuating member is released the spring tends to return the lever 9a and the actuating member 4 into the released position. The lower arm of the lever 9a pivots toward the actuating member 4 while the upper arm moves in the rearward direction and via the connecting plate 9b causes the drive shoe 7d and the interconnected adjustable block in 7b to move rearwardly so that the block contacts the shoulders 7e and returns the clamping sleeve 7a to its starting position.

In FIG. 3 a device, similar to the one illustrated in FIGS. 1 and 2, is displayed. The difference between these two embodiments involves the arrangement of the overload member. In FIG. 3 the device includes a hand gun-shaped casing 11 including a downwardly projecting handle 11a. A melting chamber 12 is located in the forward end of the casing 11 and includes an outlet or discharge nozzle 13. A trigger-like actuating member 14 is positioned in the handle 11a. A power supply 15 for the device is connected to the lower end of the handle 11a. A rod-shaped member 16 of thermoplastic material is shown extending through the rear end of the casing 11 into the rear or inlet end of the melting chamber 12. A transport slide 17 feeds the rod-shaped member 16 forwardly into the melting chamber 12. Transport slide 17 includes a clamping sleeve 17a arranged to laterally enclose and grip the rod-shaped member 16 and an adjustable block 17b which can be connected to the clamping sleeve by means of oblique wedge lugs 17d. The adjustable block 17b is connected to a transfer member 19. Transfer member 19 consists of a primary lever 19a and a secondary lever 19b frictionally connected together by a ball retainer assembly 18. Both the primary lever 19a and the secondary lever 19b are pivotally mounted about a common axis or pin 19d. A roller 19c is supported at the lower end of primary lever 19a and is in engagement with the surface of the actuating member 14. A return spring 20 biases the primary lever 19a and the roller 19c against the actuating member 14. If the resistance generated within the melting chamber 12 to the inlet movement of the rod-shaped member 6 becomes too great, the balls 18a permit the disengagement of the primary lever 19a from the secondary lever 19b so that further transport of the rod-shaped member is interrupted.

In FIG. 4 a section is shown through the device illustrated in FIG. 3 with the clamping sleeve 17a laterally enclosing the rod-shaped member 16 with the obliquely extending wedge lugs 17d located below the sleeve and extending toward the front end of the casing 11. Adjustable block 17b is guided along the inside surfaces of the casing 11. The connection between the primary lever 19a and the secondary lever 19b is clearly shown in FIG. 4. The ball retainer assembly 18 includes a pair of balls 18a with a compression spring 18b located between them and biasing them apart. The balls 18a and the compression spring 18b are located within a bore in the primary lever 19a and each ball extends into a lock opening 19e in the secondary lever 19b. In the locked position openings 19e are aligned with the bore in the primary lever 19a. The openings 19e are sized to prevent the balls from being displaced outwardly through them. In FIG. 4 pin 19d forms the common axis about which the primary lever 19a and the secondary lever 19b are pivotally mounted. The roller 19c is visible at the lower end of the primary lever 19a. Further, return spring 20 can be seen in FIG. 4 in contact with the side of the secondary lever 19b.

FIG. 5 shows a portion of FIG. 3, however, the transfer member 19 is shown in the disengaged position as compared to the engaged position illustrated in FIG. 3. If the resistance to displacement of the transport slide 17 becomes too great, the ball retainer assembly 18 is released and the transfer force to the adjustable block 17b is discontinued. With the balls 18a disengaged from the openings 19e, the primary lever 19a and the secondary lever 19b can be rotated relative to one another about the common axis 19d. When the actuating member 14 is released, the return spring 20 realigns the primary lever 19a and the secondary lever 19b so that the balls 18a can reseat in the openings 19e so that the transfer of force from the actuating member 14 to the transport slide 17 can be effected.

In FIG. 6 another embodiment of the device shown in FIGS. 1 and 3 is illustrated and the only difference over the other embodiments is in the arrangement of the overload member 28. The embodiment of the device shown in FIG. 6 includes a hand-gun shaped casing 21 with a handle 21a. The melting chamber 22 is located in the front portion of the casing 21 so that only its rear or inlet end is shown. An outlet or discharge nozzle 23 is located at the front end of the melting chamber and extends from the front end of the casing 21. A trigger-like actuating member 24 is located in the handle 21a. A power supply 25 extends into the casing through the lower end of the handle 21a. A rod-shaped member 26 of thermoplastic material extends into the casing 21 with its forward end located within the melting chamber 22 and its rearward end extending outwardly from the casing. The rod-shaped member 26 is fed into the melting chamber by means of a transport slide 27. Transport slide 27 is made up of a clamping sleeve 27a enclosing the rod-shaped member 26, and an adjustable block 27b which can be connected with the clamping sleeve by obliquely arranged wedge lugs 27d. The clamping sleeve 27a has shoulders 27e extending downwardly near its rear end and these shoulders interact with the adjustable block 27a so that a clamping sleeve 27a can be returned to its starting position after the feeding step has been completed. Adjustable block 27b is in engagement with the transfer member 29. Transfer member 29 includes a two-arm lever 29a pivotally mounted within the casing with the lever extending generally vertically and with the upper arm being connected to the adjustable block 27b by means of a longitudinal slot in the arm. A pin secured on the adjustable block 27 is fitted within the longitudinal slot. The lower arm of the lever 29a has a roller 29c mounted at its lower end. The roller 29c is in contact with the surface of the actuating member 24. The axis of rotation of the lever 29a is formed by a retaining member 28. The retaining member 28 disengages from the casing at a preset load interrupting the transfer of force from the actuating member 24 to the transport slide 27. A return spring 30 is mounted in the casing 21 and presses against the lever 29a at a position spaced below the axis of the retainer member 28. The return spring 30 presses roller 29c against the surface of the actuating member 24 and returns the lever 29a to its starting position after the actuating member 24 is released. When the lever 29 is returned to its starting position, as viewed in FIG. 6, the retaining member 28 effects reengagement with the casing 21.

In the section through the device illustrated in FIG. 7, the clamping sleeve 27a laterally encloses a part of the rod-shaped member 26 and the adjustable block 27b, guided by the housing 21, is engageable with the clamping sleeve by means of the wedge lugs 27d. At the opposite end of the lever 29 from its end in engagement with the adjustable block 27b, the roller 29c is in contact with the surface of the actuating member 24. In this figure the construction of the retaining member 28 as a pivot bearing can be appreciated. The retaining member 28 consists of two stop elements 28a each with a hemispherical surface engaged within a recess 21b formed in the inside surface of the casing 21. A compression spring 28b biases the stop elements 28a into the recesses 21b. The retaining member affords pivotal movement of the lever 29a so that the force generated by the inward movement of the actuating member 24 against the roller 29c causes the adjustable block 27b to be moved in the forward direction so that the block in moving over the lugs 27d causes the clamping sleeve 27a to grip the rod-shaped member 26 and feed it into the inlet end of the melting chamber 22. When the force acting on the pivot bearing becomes too great, the stop elements 28a disengage from the recesses 21b so that further transport of the rod-shaped member is prevented. When the force acting on the pivot bearing decreases, the return spring 30 moves the lever 29a back into its initial position. When this movement takes place, the stop elements 28a again engage within the recesses 21b so that by pressing the actuating member 4 inwardly the rod-shaped member 26 can be moved by the transport slide 27 into the melting chamber 22.

While specific embodiments of the invention have been shown and described in detail to illustrate the application of the inventive principles, it will be understood that the invention may be embodied otherwise without departing from such principles.

What is claimed is:

1. A device for melting a rod-shaped member of thermoplastic material and for discharging measured amounts of the melted material comprising a casing, a melting chamber within said casing, a transport element within said casing for gripping the rod-shaped member and feeding the rod-shaped member into said melting chamber, means for displacing said transport element for feeding the rod-shaped member into the melting chamber, said means having a first end for introducing a displacing force from the exterior of said casing and a second end in contact with said transport element for transmitting the displacing force directly to said transport element, and said means including an overload member for discontinuing the displacement of said transport element when a predetermined pressure is exceeded, and said overload member located in said means in spaced relation from said transport element and said second end of said means so that said overload member acts only indirectly on said transport element.

2. A device for melting a rod-shaped member of thermoplastic material and for discharging measured amounts of the melted material comprising a casing, a melting chamber within said casing, a transport element within said casing for gripping the rod-shaped member into said melting chamber, means for displacing said transport element for feeding the rod-shaped member into the melting chamber, and said means including an overload member for discontinuing the displacement of said transport element when a predetermined pressure is exceeded, said displacing means include an actuating member mounted on said casing, a member biased into contact with said actuating member, connecting means securing said member to said transport element, said member being pivotally mounted within said casing, said overload member pivotally mounting said member so that said overload member releases said member from pivotal movement, said member comprises a lever, said connecting means comprises an adjustable block connected to said lever and arranged to interengage said transport element on the rod-shaped member of thermoplastic material, said overload member comprising a pair of stop members and a spring biasing said stop members apart, said stop members and spring mounted in said lever, recesses in said casing for receiving said stop members for effecting the pivotal engagement of said lever when said stop members are seated in said recesses and for releasing the pivotal engagement when the predetermined pressure is exceeded.

3. A device for melting a rod-shaped member of thermoplastic material and for discharging measures amounts of the melted material comprising a casing, a melting chamber within said casing, a transport element within said casing for gripping the rod-shaped member and feeding the rod-shaped member into said melting chamber, means for displacing said transport element for feeding the rod-shaped member into the melting chamber, and said means including an overload member for discontinuing the displacement of said transport element when a predetermined pressure is exceeded, said means for displacing said transport element comprises an adjustable block displaceably engageable with said transport element for clamping said transport element on said rod-shaped member, a drive shoe engageable with said adjustable block for displacing said adjustable block, an actuating member mounted in said casing, lever means spring-biased into contact with said actuating member and connected to said drive shoe for displacing said adjustable block when said actuating member is pressed inwardly into said casing pivoting said lever means, and said overload member comprises a ball retainer assembly interconnecting said drive shoe and said adjustable block.

4. A device for melting a rod-shaped member of thermoplastic material and for discharging measured amounts of the melted material comprising a casing, a melting chamber within said casing, a transport element within said casing for gripping the rod-shaped member and feeding the rod-shaped member into said melting chamber, means for displacing said transport element for feeding the rod-shaped member into the melting chamber, and said means including an overload member for discontinuing the displacement of said transport element when a predetermined pressure is exceeded, said means for displacing said transport element comprises an adjustable block slidably engageable with said transport element for clamping said transport element on the rod-shaped member, an actuating member mounted in said casing and inwardly displaceable therein, a primary lever and a secondary lever located within said casing with said primary lever being spring-biased into contact with said actuating member and said secondary lever being engageable with said adjustable block, said overload member comprising a ball retainer assembly interconnecting said primary and secondary levers, a pin forming a common axis for pivoting said primary and secondary levers, said ball retainer assembly being arranged to release said primary and secondary levers from interconnection for preventing movement of said adjustable block for effecting movement of said transport element toward said melting chamber.

5. A device, as set forth in claim 4, wherein said primary lever and secondary lever being pivotally displaceable relative to one another when said ball retainer assembly releases the interengagement of said levers.

6. A device, as set forth in claim 5, wherein said pin and said ball retainer assembly being in spaced relation.

7. A device, as set forth in claims 3 or 4, wherein said transport element comprises a clamping sleeve arranged to encircle and grip the rod-shaped member with said clamping sleeve having a slot extending in the axial direction thereof for the full length of said sleeve, lugs formed on said sleeve and disposed in diverging relationship in the axial direction of said sleeve toward said melting chamber, and said adjustable block being slidable over said lugs for pressing said lugs inwardly and causing said clamping sleeve to grip the rod-shaped member.

8. A device, as set forth in claim 7, wherein said clamping sleeve having shoulders thereon for engagement with said adjustable block so that said adjustable block contacts said shoulders for displacing said clamping sleeve in the direction away from said melting chamber when said means for displacing said transport element are released.

9. A device for melting a rod-shaped member of thermoplastic material and for discharging measured amounts of the melted material comprising a casing, a melting chamber within said casing, a transport element within said casing for gripping the rod-shaped member and feeding the rod-shaped member into said melting chamber, means for displacing said transport element for feeding the rod-shaped member into the melting chamber, and said means including an overload member for discontinuing the displacement of said transport element when a predetermined pressure is exceeded, said transport element comprises a clamping sleeve arranged to encircle and grip the rod-shaped member with said clamping sleeve having a slot extending in the axial direction thereof for the full length of said sleeve, lugs formed on said sleeve and disposed in diverging relationship in the axial direction of said sleeve toward said melting chamber, and said means for displacing said transport element comprising an adjustable block slidable over said lugs for pressing said lugs inwardly and causing said clamping sleeve to grip the rod-shaped member.

10. A device, as set forth in claim 1 or 9, wherein said first end of said displacing means includes an actuating member mounted on said casing, a member biased into contact with said actuating member, connecting means securing said member to said transport element, said member being pivotally mounted within said casing, and said overload member pivotally mounting said member so that said overload member releases said member from pivotal movement.

11. A device, as set forth in claim 9, wherein said clamping sleeve having shoulders thereon for engagement with said adjustable block so that said adjustable block contacts said shoulders for displacing said clamping sleeve in the direction away from said melting chamber when said means for displacing said transport element are released.

* * * * *